(12) United States Patent
Kuster et al.

(10) Patent No.: US 6,227,282 B1
(45) Date of Patent: *May 8, 2001

(54) PROCESS FOR THE ALUMINOTHERMIC WELDING OF RAILS WITH ALLOYING OF THE WELD METAL IN THE RAIL HEAD REGION

(75) Inventors: Frank Kuster, Ratingen; Gerhardus Johannes Mulder, Essen, both of (DE); Donald MacRae, Benoni-North (ZA); Michael Steinhorst, Essen (DE)

(73) Assignee: Elektro-Thermit GmbH, Essen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/928,540

(22) Filed: Sep. 12, 1997

(30) Foreign Application Priority Data

Sep. 13, 1996 (DE) .............................................. 196 37 283

(51) Int. Cl.⁷ .................................................. B23K 23/00

(52) U.S. Cl. ................................ 164/54; 164/58.1; 249/86
(58) Field of Search ........................... 164/54, 57.1, 58.1, 164/59.1; 249/86

(56) References Cited

U.S. PATENT DOCUMENTS 1,760,010 * 5/1930 Schultz ................................... 249/86
3,495,801 * 2/1970 Krüger ................................... 164/54

FOREIGN PATENT DOCUMENTS 658 817 12/1986 (CH) .
580035 * 7/1933 (DE) ...................................... 164/54
898 989 12/1953 (DE) .

* cited by examiner

Primary Examiner—Kuang Y. Lin
(74) Attorney, Agent, or Firm—Brown & Wood, LLP (57) ABSTRACT

The invention relates to a process for the aluminothermic welding of rails, the aluminothermically produced steel being poured into a refractory mold surrounding the rail ends which are to be joined, and alloying additives being contacted with that part of the steel which runs out of the reaction crucible and forms the weld in the rail head region, wherein the alloying with the alloying additives is carried out after the completion of the aluminothermic reaction and separation of the steel from the slag via the diverting plug in the mold, and the overflow in the is closed.

13 Claims, 8 Drawing Sheets

PROCESS FOR THE ALUMINOTHERMIC WELDING OF RAILS WITH ALLOYING OF THE WELD METAL IN THE RAIL HEAD REGION

BACKGROUND OF THE INVENTION

The invention relates to a process for the aluminothermic welding of the rails with controlled alloying of the weld metal in the rail head region. The object of the process is purposefully to set a desired property pattern in the weld in accordance with the requirements of the track.

DESCRIPTION OF THE PRIOR ART

The aluminothermic welding process (THERMIT process) is the only one of the known fusion-welding processes which exploits a chemical reaction for generating the hot molten filler material.

In this case, the high affinity of aluminum for oxygen is utilized for the reduction of heavy metal oxides, preferably iron oxide.

The process which operates highly exothermically can be described as or for the iron reaction After punctiform ignition using a small pilot rod, the aluminothermic reaction proceeds in a crucible within a few seconds, with vigorous evolution of heat. The hot reaction products at approximately 2500° C. then separate from one another, the lower-density slag ($Al_2O_3$) floating on the iron.

Granulated steel particles for damping the reaction and, depending on the base material to be welded, steel formers such as C, Mn, Cr, V, Mo are mixed into the base constituents of the THERMIT fraction—iron oxide and aluminum of small grain size.

The hot molten THERMIT steel of defined quality, smelted in the reaction mixture, is outstandingly suitable for welding process purposes.

The welding process can be characterized by the following working steps:
  aligning the workpieces laid with a gap depending on the welding cross section and the process;
  forming a refractory mold around the welding point;
  preheating the ends of the workpieces by means of a special burner with gas/air, gasolene/air, gasolene/oxygen, acetylene/oxygen or preferably propane/oxygen mixtures;
  pouring of the hot molten steel into the mold and welding of the workpiece ends by intercasting and casting-in.

Using this process, workpieces of any type with any desired cross-sections can be welded together during construction or repair. Because its procedure is simple and independent of external energy sources, the THERMIT welding process has found its most widespread application in rail welding.

The aluminothermically generated steel, serving here as the welding material, should correspond in its strength properties as far as possible to the rail steel.

This demand is met by the known aluminothermic mixtures—also called welding portions—by adding alloying elements such as, in particular, carbon, manganese, chromium, silicon, vanadium and titanium to the base mixture consisting of aluminum and iron oxides. For damping and cooling, iron or scrap steel are also mixed into the aluminothermic mixture, whereby the steel yield is increased at the same time.

Thus, very specifically alloyed rail grades are sometimes used in various countries, where there is an interest in concentrating these specific alloying elements under control in the rail head in defined concentrations corresponding to the rail composition, without the rail foot being alloyed.

In recent years, however, head-hardened rails have increasingly been used in rail traffic. The reason for this trend is that, on the one hand, the stresses on the rails increase which leads to intensified wear in conventional rails and, on the other hand, there are increasingly economic imperatives, so that longer replacement cycles of rails are desired.

For example, particularly tight radii (<300 m), extreme gradients or the increasingly rising axle loads, in particular in countries with predominantly heavy-load traffic, such as in North America, South Africa, Asia and Australia, represent an increasing stress on the rail, which must be taken into account both for the rail and for the joining of rails.

The increased use of head-hardened rails of course also makes it necessary to adapt the required joining technologies.

It would here be of particular interest for the track operation, to achieve an increase in hardness in the head region and, in relation thereto, increased ductility in the foot of the rail.

In addition, grain-refining alloying additives are also frequently used where controlled concentration in the head would be desired.

Hitherto, the thermit welding portions have thus been modified in newly developed rail grades, so that the entire rail joint was adapted to the changed rail grade but itself showed a uniform property pattern.

This means that, in conventional aluminothermic welding technology, hardening additives are mixed into the welding portion in order to effect the required hardness in the head region, but that simultaneously the same hardness is obtained in the entire rail profile, that is to say also in the rail foot region, where ductility is rather more desired.

CH-PS 658 817 describes a process for the aluminothermic composite welding, in which two cast steel alloys are made up from two welding materials of different composition in such a way that they give in each case, from two crucible chambers, one hard and wear-resistant steel for the rail head and a tough ductile steel, flowing first into the mold, for the welding of the web and rail foot.

This means that this process is a two-stage process. This procedure is very time-consuming and, for use in practice on the track, so complicated that it has not been able to gain acceptance in the face of the conventional thermit joint-welding known worldwide. In addition, further interfaces are formed between the two thermit steels, it being possible for undesired defects to arise in the weld.

From DE-PS 898,989 it is known that the iron formed in the aluminothermic reaction can be alloyed with steel-refining metals or metalloids which are located in an excavation in the upper parts or on the bottom of the mold surrounding the material to be welded.

It is the object of this invention to provide a thermit steel which is as homogeneous as possible and to avoid possible losses of required alloying additives via the slag as far as possible. However, it is pointed out that intimately and thoroughly mixed steel is desired.

Moreover, it is expensive in production technology and in addition difficult in the case of alloying the rail head to incorporate these metals or metalloids in the mold, since the distance between the mold and the running surface, which is to be alloyed, of the rail head is large. The metal/metalloid must overcome this distance solely by diffusion.

There was thus a need for the simplest possible welding process which comprises only one process step or reaction step, to provide the metals or metalloids to be alloyed in a simple but also reliable manner, that is to say both in the preparation of the required consumable materials and in the installation of the thermid weld, and also makes it possible to concentrate these alloying additives under control in the head of the weld. It is the object of the welding process to be developed to produce a joint which is in accordance with the property pattern of the rails to be welded and in particular achieves a hard weld material, which is as fine-grained as possible, in the rail head, and at the same time ensures a foot which is less prone to breakage and is as ductile as possible.

By means of such a welded joint, the wear resistance and the associated economic advantages would be realized and the quality of the weld would be improved because of the higher hardness and a microstructure of higher load-bearing capacity due to the finer grain.

Depending on the alloying element or combination of alloying elements and on the quantity to be alloyed in, a different property pattern—chemical composition of the steel, mechanical properties, microstructure and the like—can be set. These different properties depend in part on one another, according to the nature and quantity of the additive.

There was a particular need for the simplest possible, most reliable and reproducible methods in the aluminothermically produced methods in the aluminothermic intercast welding of rails, which allow the aluminothermically produced steel to be contacted under control with thermit steel additives to be alloyed in with that part of the steel which runs out of the reaction crucible and forms the weld in the rail head region.

Futhermore, intimate thorough mixing of the thermit steel within the casting mold must be avoided at all costs. Otherwise, a concentration of alloying additives in the head cannot be achieved.

SUMMARY OF THE INVENTION

The subject of this present invention is a process wherein the alloying with the alloying additives is carried out after the completion of the aluminothermic reaction and separation of the steel from the slag via the diverting plug in the mold, and the overflow in the mold is closed.

DETAILED DESCRIPTION OF THE INVENTION

Figure 1:
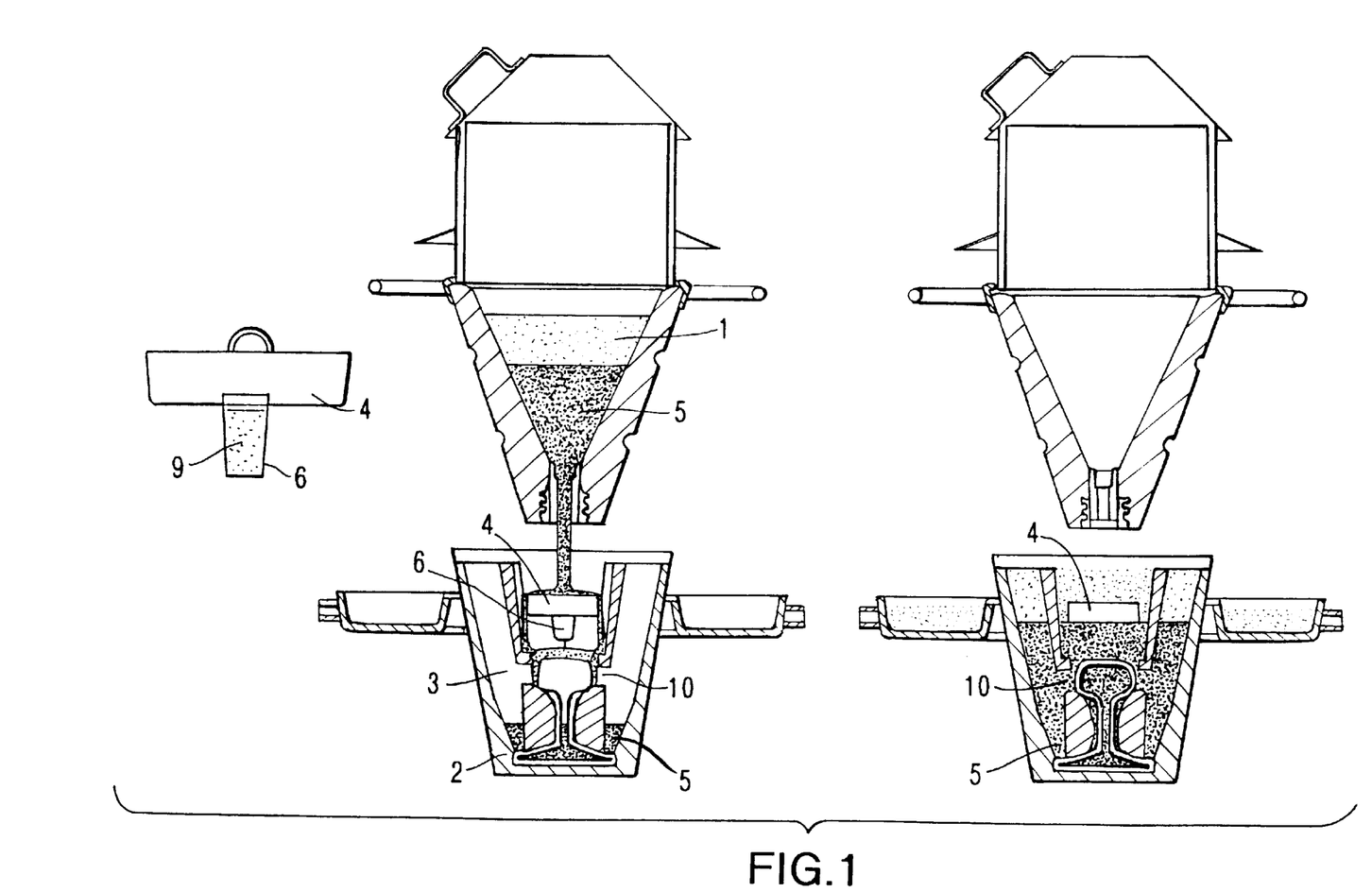
FIGS. 1–3 are cross-sectional views of apparatus useful in the practice of the invention.

The overflow, which is to be closed, in the mold is marked (10) in FIG. 1.

Figure 2:
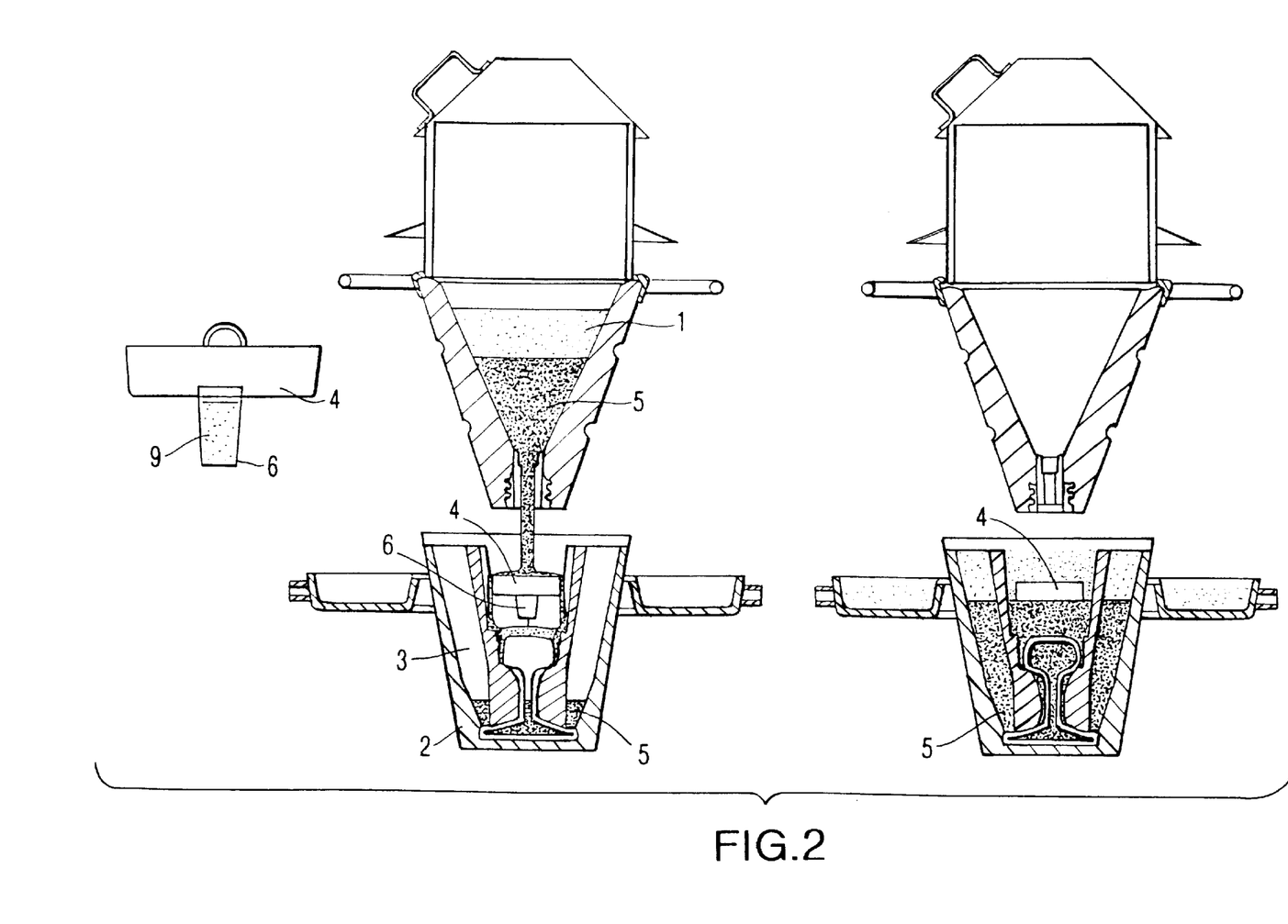

In the welding process according to the invention with top pouring—referring e.g. to FIG. 2—the steel (5) runs, after the reaction of the aluminothermic mixture in the reaction crucible (1), into the center of the mold (2) and ascends there or in the risers (3), the overflow being closed.

The steel running last out of the reaction crucible thus forms the head of the rail and, according to the invention, has to be alloyed. This means that alloying of the steel, running out first, with the alloying components must be avoided. This is achieved by arranging the alloying constituents (9) in the mold at the level of the rail head in such a way that the steel running in as the first portion contacts only with the rising level of the liquid steel in the mold, and the liquid steel then located at the top comes into contact with the alloying constituents (9). This is possible, for example, by arranging the alloying constituents below the diverting plug (4) which is usually present in the molds used in the aluminothermic body which is fitted, covering the railhead, in the upper region of the mold and onto which the steel running in is allowed to impinge, in order to absorb its kinetic energy, and is thus guided into the rail region of the mold. The alloying constituents can here be positioned in a suitable manner in the underside of the diverting plug, integrated in a cavity, or as a molding or in a container, for example as a capsule (6), at the required distance, in order to effect the contacting precisely at the desired level of the rail head.

It is also possible to leave the overflow open. However, the overflow must then be arranged in such a way that the thermit steel flowing out first cannot prematurely come into contact with the alloying additives and with the steel running out last, that is to say before it reaches the head or at the head. This is achieved by locating the overflow above the alloying additives or below the rail head.

Figure 3:
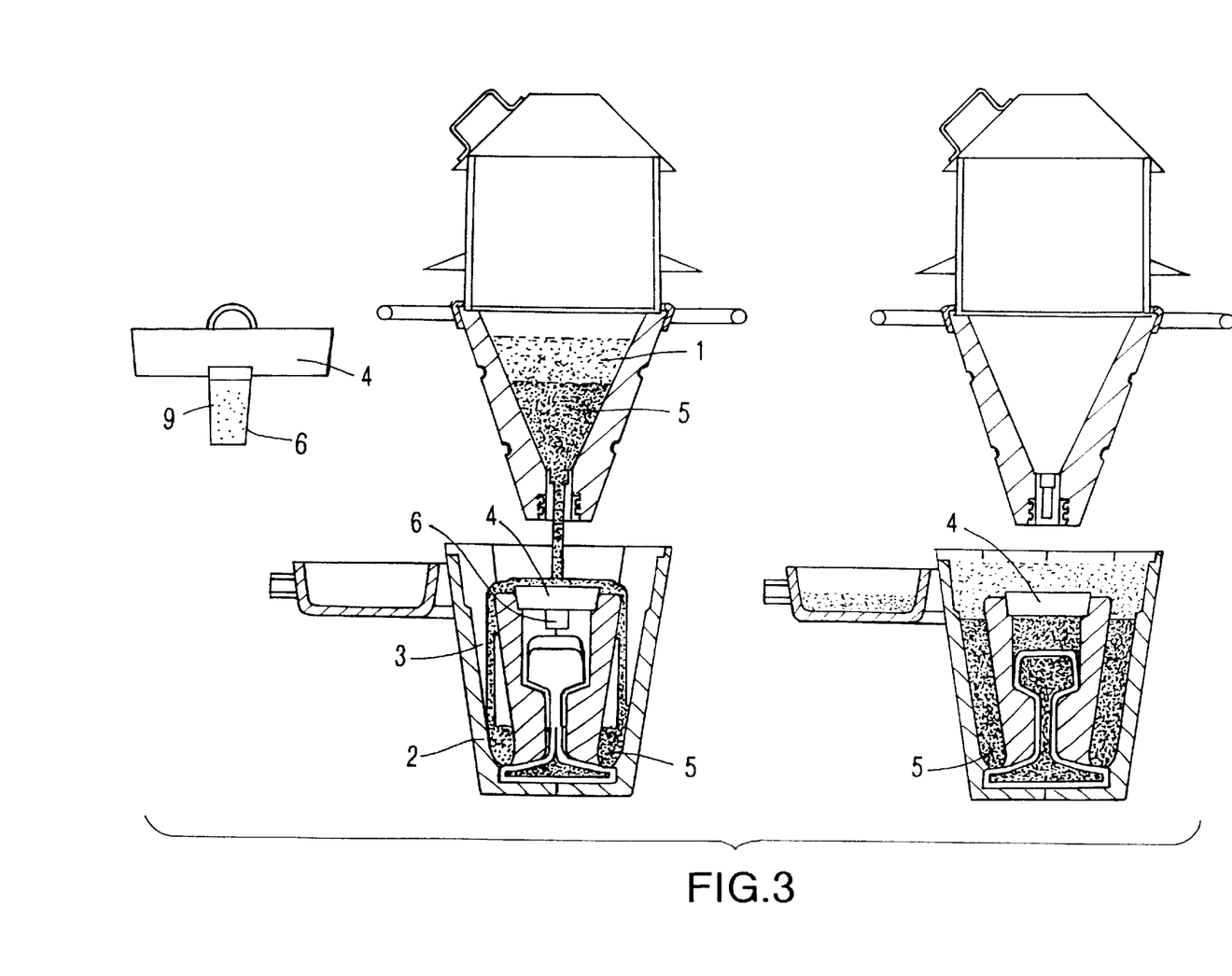

An aluminothermic weld can also be made by an uphill-pouring process as shown in FIG. 3. In this case, the aluminothermically produced steel is caused to run not into the rail region of the mold, but through the risers (3) into the mold (2). The steel running in then rises in the rail region of the mold. In this case, the steel first running into the mold thus forms the weld metal at the rail head so that, in this casting process, the steel running in first must be appropriately alloyed. This can be effected, for example, by fitting the alloying constituents both on the upper side and/or on the underside of the diverting plug (4).

The fitting on the underside corresponds to the contacting of the alloying constituents in top pouring, that is to say the rising steel is contacted in the rail head region with appropriate alloying elements at the underside of the diverting plug and alloyed at a later stage. It is possible to incorporate the alloying elements in a massive form into the underside of the diverting plug or to fit them as granules in a capsule or in a pendant ladle below the diverting plug.

Here again, the overflow in the mold should preferably be closed. In the case of the open overflow, the latter should be located preferably below the rail head or else above the alloying additives.

When the alloying additives are arranged on the upper side, the steel running out first takes up the alloying constituents when it flows over the diverting plug and, rising as the first part in the rail region, forms the thus hardened weld metal at the rail head. In this case, the overflow must preferably be closed or else located above the rail head.

The alloying constituents can here be applied in the most diverse ways. For example, they can be applied simply as a powder or as granules to the upper side of the diverting plug as a composite construction from a ceramic layer bonded with a layer of alloying components.

Thus, all methods of alloying of an aluminothermically produced iron or thermit steel at a later stage by means of the diverting plug in the mold are subjects of this invention.

As the alloying additives which are picked up by the thermit steel at a later stage, on the one hand hardening and/or grain-refining metals or alloys are to be preferred. These include the ferro-alloys of the elements V, Ti, Nb, Cr, Mn, Si and the like, the rare earths or the oxides and carbides thereof as well as carbon in bound or elemental form.

Depending on the nature and quantity of the alloying additives made available, it is thus possible by means of the methods according to the invention to achieve desired concentration gradients of the separately added elements in the weld and adapt these in a controlled manner to the track loading.

The components alloyed in at a later stage can be employed in the elemental or metallic form or as a metallothermic reaction mixture.

This procedure is thus independent of the chemical state of the component to be alloyed in, depending on the particular choice of diverting plug.

The alloying elements added to the thermit steel at a later stage are preferably employed in the form of powders or granules. In this case, the additives are accommodated in a container, for example an iron capsule, or in an excavation in the diverting plug.

Usually, the starting standard mixture employed in the process according to the invention is an aluminothermic mixture consisting of essentially aluminum, iron oxide and damping agent, with which carbon contents from 0.1 to 1.0% by weight and manganese contents from 0.2 to 2.0% by weight in the weld are obtained.

The alloying constituents carbon and manganese do not necessarily have to be provided via the aluminothermic mixture. This is also possible by means of the alloying method according to the invention, which allows the later alloying with any desired alloying constituents both in the uphill—and in the top-pouring process. In this case, only iron is produced aluminothermically.

With a suitable choice of the alloying method, the alloying elements and their concentration, the weld can be adapted as closely as possible under control to the property pattern of the rail such as, for example, chemical composition or hardness. For example, a hardness gradient in the weld with a comparatively hard rail head and a soft rail foot can be produced in a very simple manner.

Like the hardness, the deflection (static bend test) and the resistance against crack generation and propagation depend on the material, so that an improvement in these characteristic data is obtained in the case of a more ductile rail foot.

The deflection, more precisely the deflection at the moment of fracture, is determined in a static bend test. In addition to the deflection, the fracture load is established, that is to say the maximum force to be applied for breaking of the welded rail, and, with unchanged geometry, this is also a measure of the bending strength. In contrast to the deflection, the breaking load depends only on the geometry of the rail, so that it is not possible to influence this mechanical characteristic by alloying technology.

A special characteristic for the operational reliability of a track is the crack-resisting force, that is to say the force which a material can exert against crack formation and propagation. It is known that, the crack-resisting force increases with increasing toughness of the material. The process according to the invention therefore provides an improved crack-resisting force owing to the more ductile foot.

When alloying the steel which forms the rail head and which has a temperature of about 2100° C. when it runs into the mold, a controlled concentration of suitable alloying elements, to be picked up the liquid thermit steel at a later stage, in the rail head region of the welded joint is achieved. In this way, the property pattern can be influenced in a controlled manner. This includes the hardness, deflection, crack-resisting force and wear resistance.

Figure 4:
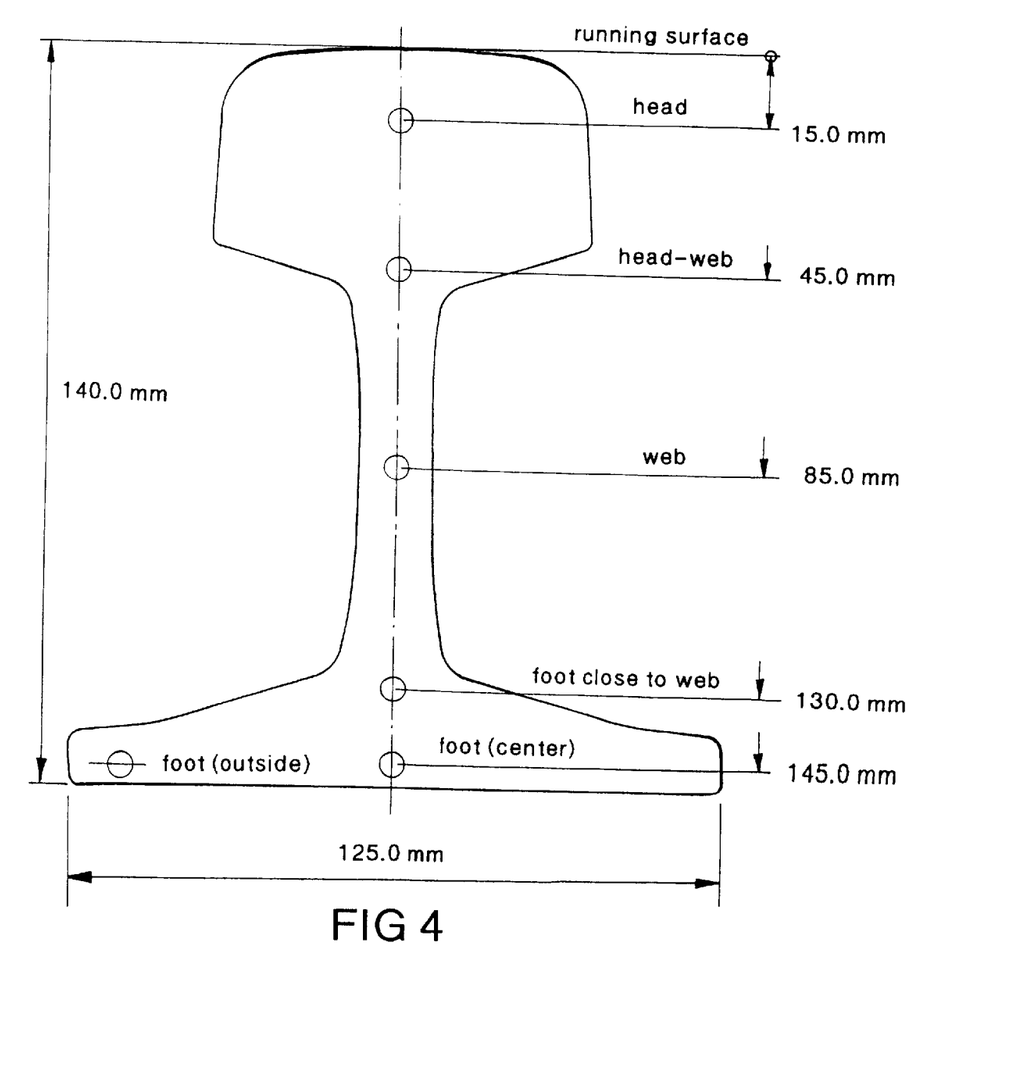
FIG. 4 is a cross-section view of a rail, marked to show analysis points and hardness points.

The hardness gradients achievable according to the invention in the rail profile are explained in more detail in what follows:

First, FIG. 4 shows the measured analysis points and hardness points at a distance from the running surface (in mm), taking the rail profile S 49 having a weight per meter of 49 kg/m as an example.

Figure 5:
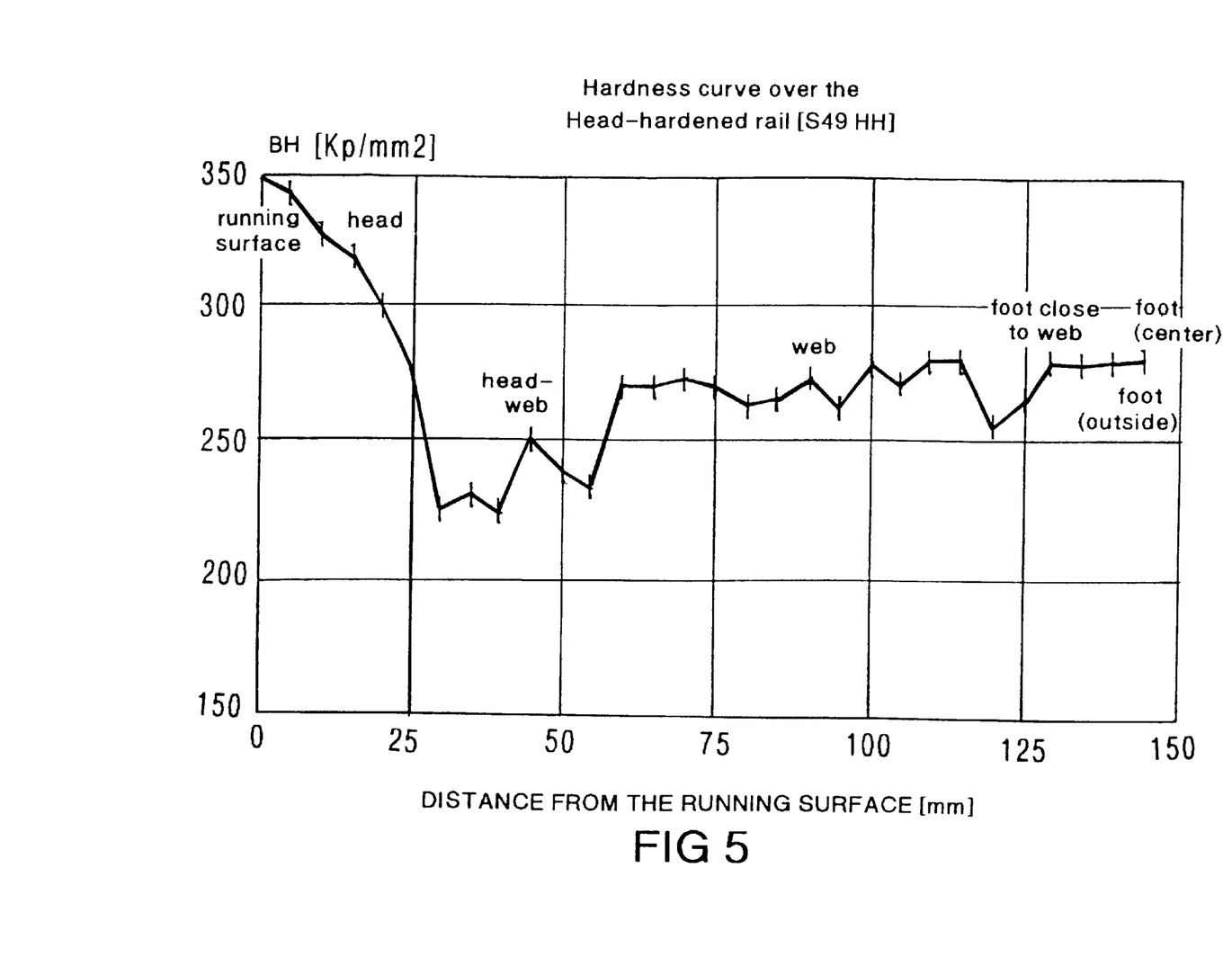
FIG. 5 is a graph of the hardness of a rail head-hardened in accordance with the invention.

FIG. 5 represents the hardness curve of a head-hardened rail (S 49 HH), expressed in BH (Brinell hardness) in $kp/mm^2$ at the respective distance from the running surface, as shown in FIG. 4. It can clearly be seen that the hardness is increased in the rail head region as compared with the rest of the profile.

Figure 6:
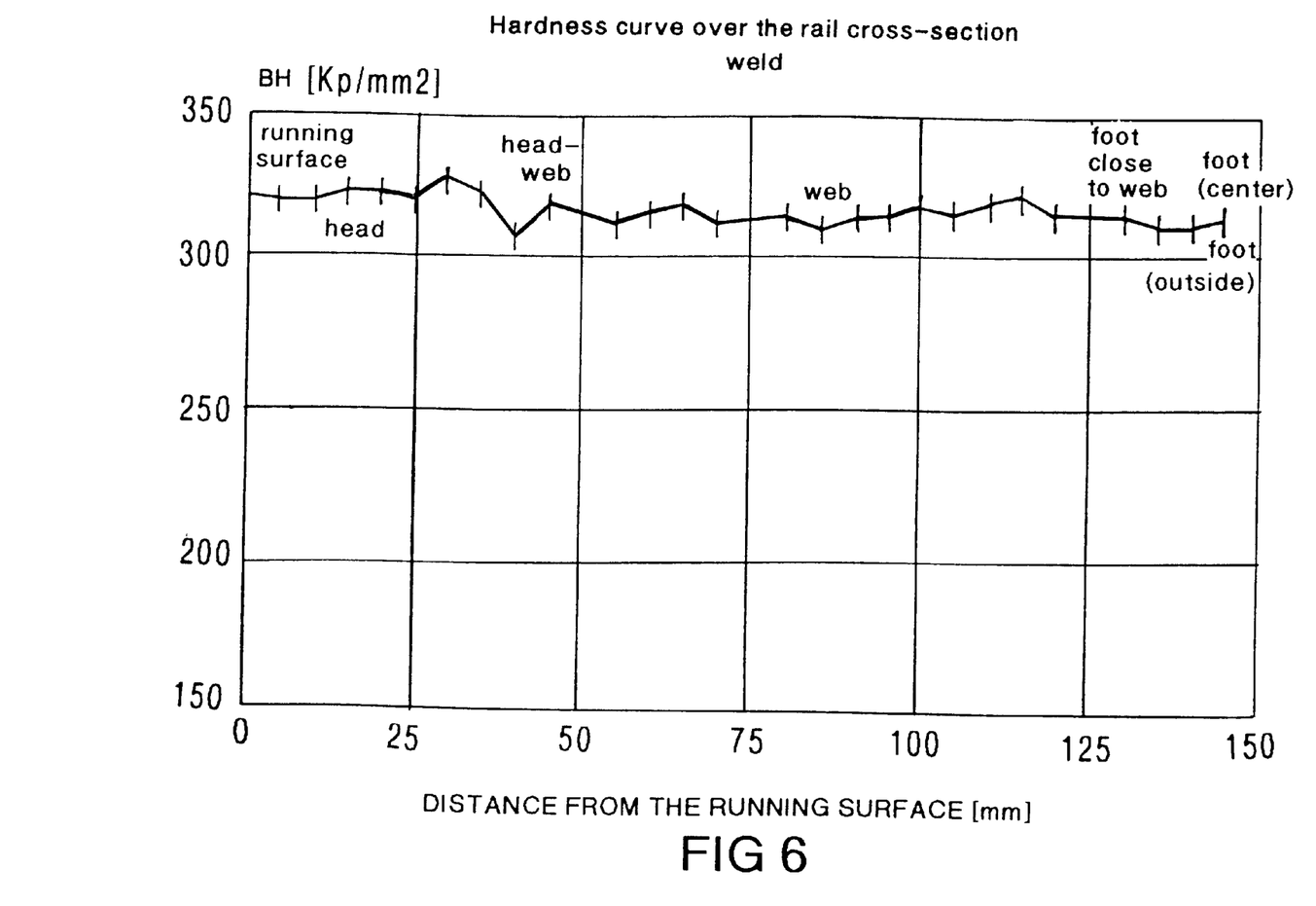
FIG. 6 is a graph of the hardness of a conventionally head-hardened rail.

FIG. 6 shows the hardness curve of a currently conventional aluminothermic weld in head-hardened rails. In this case, essentially hardness in the rail head; this hardness is, however, uniformly present in the entire rail profile of the weld, with the disadvantages described above.

Figure 7:
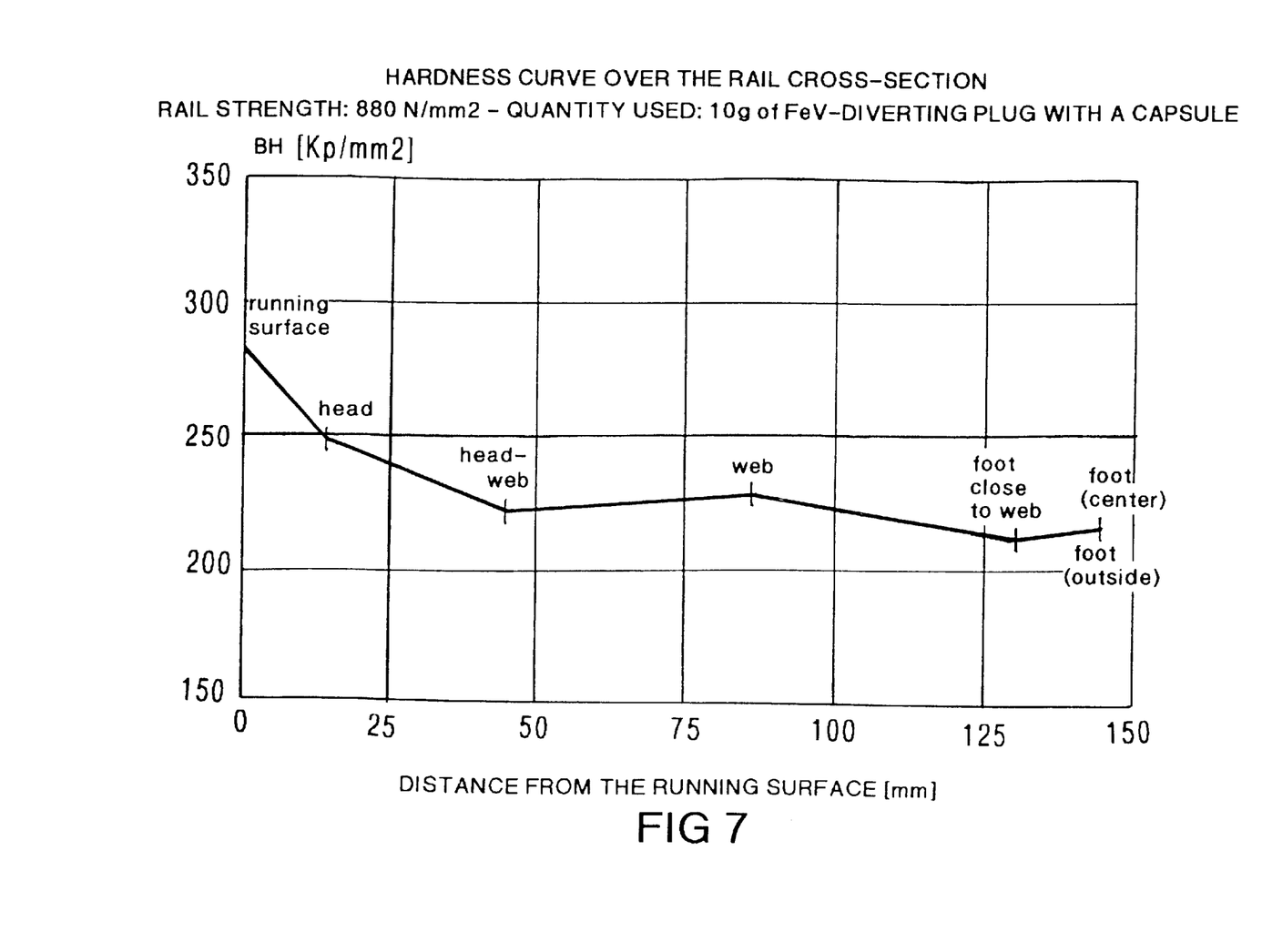
FIG. 7 is a graph of the hardness of a weld prepared by this invention.

In FIG. 7, the hardness profile of a weld with alloying according to the invention in the rail head region is shown. The alloying was carried out with 10 g of FeV. The weld was made by uphill-pouring. The alloying constituents were positioned in a capsule below the diverting plug. The decrease in hardness from the desired high hardness in the head region down to the higher ductility in the foot region can clearly be seen.

Figure 7A:
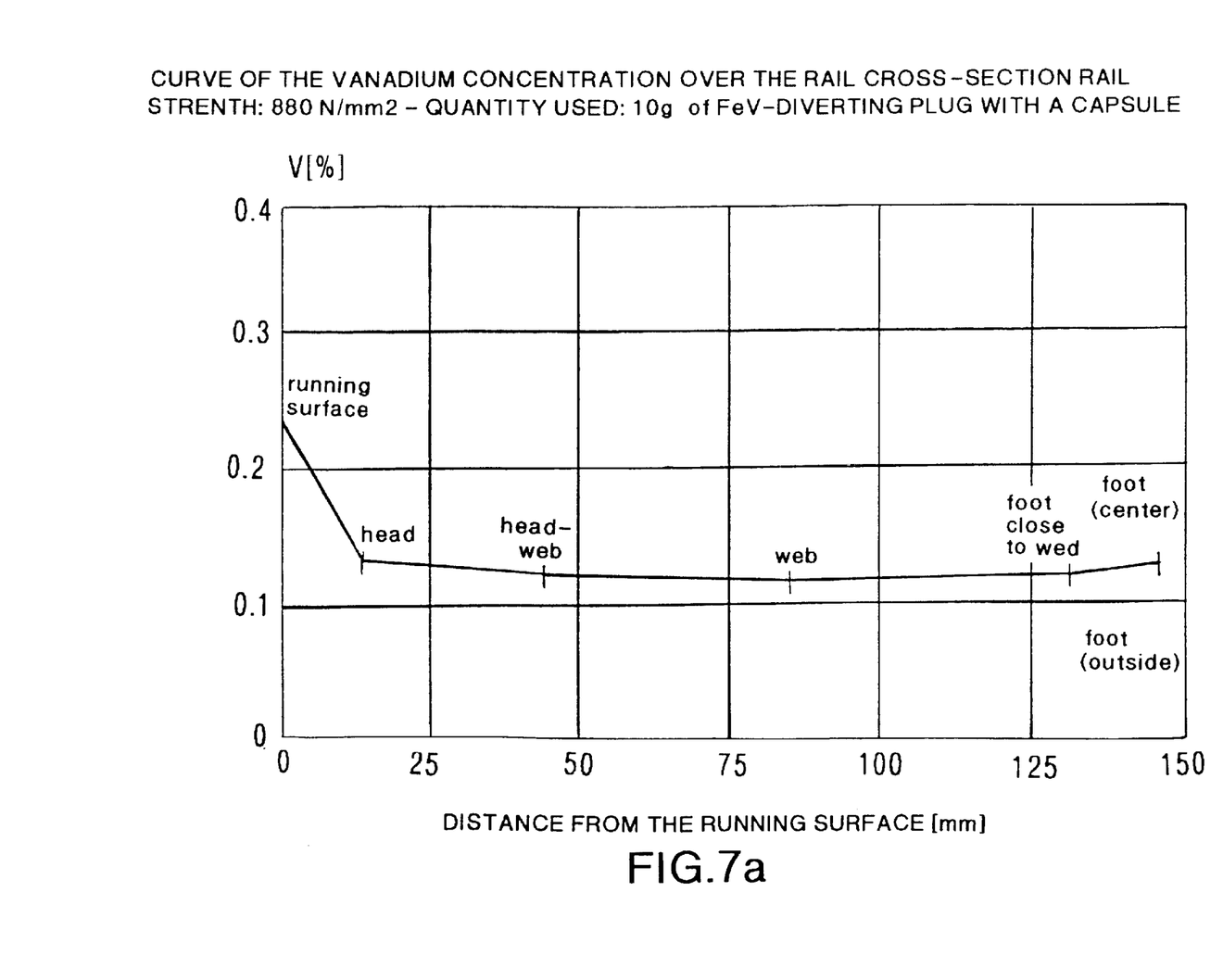
FIG. 7a is a graph of the vanadium content at various points in a rail welded by this invention.

FIG. 7a shows the corresponding vanadium contents at the measurement points.

In this case, a deflection of 34 mm was obtained during the conventional static band test at a Brinell hardness of 268 $kp/mm^2$ at the running surface of the weld metal.

What is claimed is:

1. A process for aluminothermic welding of rail ends, comprising the steps of providing a refractory molds for surrounding the to-be-welded rail ends and including an overflow and a diverting plug fitted in an upper region of the mold covering a rail head of the to-be-welded rail ends for absorbing kinetic energy of a molten steel to be poured into the mold, and carrying alloying additives; aluminothermically producing the molten steel in a reaction crucible; and pouring the molten steel produced in the crucible over the diverting plug and into the mold, wherein the molten steel poured into the mold includes a rail head-forming portion; and wherein the process further comprises the step of contacting of only the rail head-forming portion of the molten steel with the alloying additives, which are carried by the diverting plug, after the rail head-forming portion has been separated from a slag and with the overflow being closed.

2. The process as claimed in claim 1, wherein the alloying additives are arranged in a container below the diverting plug.

3. The process as claimed in claim 1, wherein the alloying additives are arranged on top of the diverting plug.

4. The process as claimed in claim 1, wherein the alloying additives are arranged in an excavation below the diverting plug.

5. The process as claimed in claim 1, wherein the alloying additives are employed in the form of a powder or granules.

6. The process as claimed in claim 2, wherein the alloying additives are employed in the form of a powder or granules.

7. The process as claimed in claim 3, wherein the alloying additives are employed in the form of a powder or granules.

8. The process as claimed in claim 1, wherein the alloying additives are suspended below the diverting plug.

9. The process as claimed in claim 1, wherein the alloying additives are employed in a solid, compact form.

10. The process as claimed in claim 2, wherein the alloying additives are employed in a solid, compact form.

11. The process as claimed in claim 3, wherein the alloying additives are employed in a solid, compact form.

12. The process as claimed in claim 4, wherein the alloying additives are employed in a solid, compact form.

13. The process as claimed in claim 8, wherein the alloying additives are employed in a solid, compact form.

* * * * *